United States Patent
Fan et al.

(10) Patent No.: US 8,482,807 B2
(45) Date of Patent: Jul. 9, 2013

(54) EMBEDDING INFORMATION USING MODULATED PERIODIC LINE PATTERNS

(75) Inventors: Zhigang Fan, Webster, NY (US); Reiner Eschbach, Webster, NY (US); Judith Stinehour, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 763 days.

(21) Appl. No.: 12/637,041

(22) Filed: Dec. 14, 2009

(65) Prior Publication Data

US 2011/0141530 A1 Jun. 16, 2011

(51) Int. Cl.
*H04N 1/32* (2006.01)
*G06T 22/00* (2006.01)

(52) U.S. Cl.
USPC ........................................ 358/3.28; 382/100

(58) Field of Classification Search
None
See application file for complete search history.

(56) References Cited

U.S. PATENT DOCUMENTS

| 7,580,153 B2 | 8/2009 | Eschbach |
| 7,589,865 B2 | 9/2009 | Eschbach |
| 7,644,281 B2 * | 1/2010 | Deguillaume et al. ........ 713/176 |
| 8,208,683 B2 * | 6/2012 | Yamamoto et al. .......... 382/100 |
| 2008/0296885 A1 * | 12/2008 | Fan et al. ........................ 283/67 |
| 2008/0297852 A1 | 12/2008 | Fan |

* cited by examiner

*Primary Examiner* — Barbara Reinier
(74) *Attorney, Agent, or Firm* — Fay Sharpe LLP

(57) ABSTRACT

A method and system is provided providing a variable data guilloché pattern comprised of variable data differential line pattern fonts comprising decodable template symbols which are capable of being selectively assembled into a predetermined variable data code. The differential line pattern fonts are further spatially modulated for imposition of a second data channel on a printed document. The representation can be decoded with a digital scanner capable of identifying the embedded patterns and spatially modulated transform function and communicate it to a user for verifying a document containing the code.

13 Claims, 7 Drawing Sheets

EMBEDDING INFORMATION USING MODULATED PERIODIC LINE PATTERNS

CROSS REFERENCE TO RELATED PATENTS AND APPLICATIONS

Cross reference is made to the following applications: U.S. Patent Publication No. 2008-0297852-A1, published Dec. 4, 2008, entitled "Variable Data Periodic Line Patterns For Composing A Font System" and U.S. Patent Publication No. 2008-0296885-A1, published Dec. 4, 2008, entitled "Font Printing System Having Embedded Security Information Comprising Variable Data Periodic Line Patterns" incorporated by reference herein.

TECHNICAL FIELD

The presently disclosed embodiments are directed to periodic line pattern printing systems particularly applied as background to humanly perceptible alphanumerical, graphical or pictorial information.

BACKGROUND

Since print systems have been in existence, printers have sought methods for inhibiting counterfeiting and unauthorized copying of printed documents. Enhanced complexity in an engraved pattern of a press plate is one such method that most people are familiar with as a result of its everyday observation in currency bills. Bank checks, security documents, bonds and other financial documents are other examples of printed documents having complex background patterns to inhibit unauthorized reproduction. Identification documents, e.g. passports, social security cards and the like, are other examples. Credit cards not only have complex background patterns, but now also have embedded holographics to enhance verification and authentication of such a card.

As far as printed documents are concerned, a common complex background pattern is a guilloché line pattern, i.e., an ornamental pattern or border consisting of lines flowing in interlaced curves. The guilloché patterns are designed to be hard to reproduce and thus can serve as a security feature. However, an associated disadvantage is that the applied pattern or information is often fixed in nature. Accordingly, the fixed nature of the pattern means that it is common and identical on all documents on which it is printed. Often it is preprinted on the document before the document is usually used (e.g., checks).

Even though such background patterns are designed to be hard to reproduce, they are fixed. For example, every passport has the same pattern as all passports from that country, every monetary note has the same pattern as the same note from that country, any credit card has the same pattern, etc. This actually decreases the amount of security afforded by a guilloché since it is sufficient to re-create one pattern in order to counterfeit all such patterned credit cards. It would therefore be desirable and a substantial improvement to have a variable guilloché, where, for example, the credit card number is embedded in the guilloché and thus every credit card has a different pattern (to a decoder) while having the identical human visual impression.

U.S. Patent Publications Nos. 2008-0297852-A1 and 2008-0296885-A1 disclose systems for embedding security information that more particularly identifies a particular document in a unique manner so that whatever information is embedded is visually imperceptible to an intended counterfeiter or unauthorized copyist even for a single document produced in a print run of the one document only. Periodic line patterns are printed as a part of the document background. Subtle modification of the line pattern embeds the information without introducing noticeable artifacts. When the document containing the embedded data is later scanned, the information can be retrieved. This information can be used for many different purposes, which include authentication (e.g., comparing the embedded name information with the name on the check), process control (e.g., routing a check), and banking automation (e.g., recording the dollar amount of a check into the user's account). However, in these systems, the carrier of the embedded information is a periodic line pattern that is merely defined on a regular Cartesian coordinate system.

There is thus a need for a system which better hides security data within a printed document, and that which can embed security data unique to that particular document so that the security information is successfully implemented for even a document production run of one document. it is also desirable that this solution be obtained without physical modification to the printing device and without the need for costly special materials and media.

SUMMARY

According to the aspects illustrated herein, a guilloché is created that encompasses fully variable data that can be created in real time. The periodic carriers are geometrically modulated, which provides more freedom in guilloché mark design to better satisfy various aesthetic needs. Moreover, the modulation also provides additional security as well as an extra information embedding channel via the modulating transform which may carry additional control and/function information.

According to aspects illustrated herein, there is provided a method of encoding a periodic line pattern comprising a periodic line pattern; segregating the periodic pattern to a plurality of cells; modulating selected ones of the plurality cells wherein the modulating could be representative of predetermined information; and, later when the document is printed and scanned, demodulating the selected ones for decoding the predetermined information. The modulating comprises spatially modulating the periodic pattern by imposing a transform function of periodicities in the periodic line pattern.

According to another aspect illustrated herein, there is provided a printing system including an electronically stored periodic line pattern residing in a memory for use in securing or identifying a document printed by the printing system. The system comprises a periodic line pattern capable of encoding with data by selected geometric variation; a first set of distinguishable variations of the base patterns, each variation corresponding to an encodable symbol, wherein the variation is disposed in a portion of the periodic line pattern comprising a data cell; and, a second set of distinguishable variations of the pattern comprising a spatial modulation of the periodic line patterns.

DETAILED DESCRIPTION

As noted above, periodic line patterns, such as guilloché patterns, are commonly used in graphic design for security documents such as checks and currency notes.

Figure 1A:
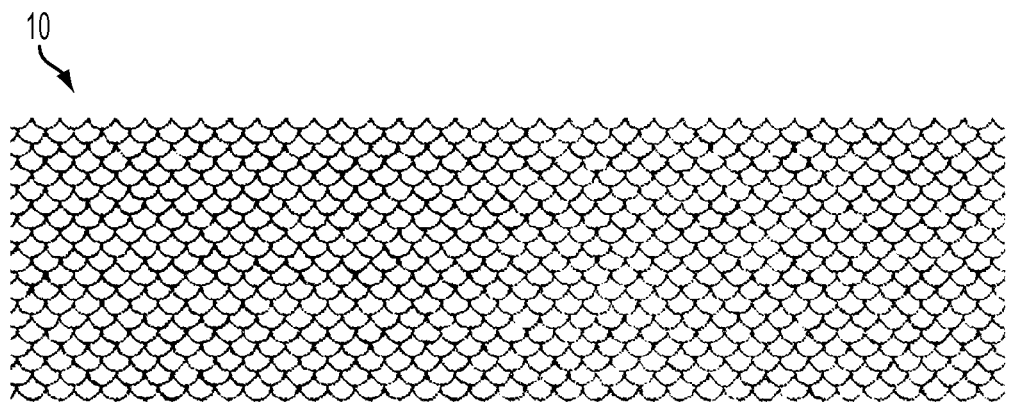
FIG. 1A is periodic line pattern.

By definition, a period pattern can be generated by a repetition or tessellation of a "base pattern", although other space tiling shapes and tile shifts/offsets are also possible and considered within the scope of this description. The base pattern has the property that there is no artificial discontinuity if two base patterns are placed next to each other, whether in a horizontal or vertical direction. FIG. 1A is an example of period pattern 10, comprising a seamless, tillable association of periodic elements The term "line pattern" used throughout this description is considered to be general, encompassing classical line patterns created in the guilloché process, as well as figurative patterns, icons and the like.

In the foregoing referenced applications it is taught how geometric variations in periodic patterns can provide a variable data guilloché pattern comprised of variable data differential line pattern fonts of decodable template symbols which are capable of being selectively assembled into a predetermined variable code. The code representations are embedded in the guilloché pattern amongst a plurality of unvaried standard base patterns. The representation can be decoded with a digital scan capable of identifying the embedded information and communicated to a user. The subject embodiments relate to further modulating the periodic pattern with a transform function so that such spatial modulation is capable of conveying additional information or a control/registration signal. Such modulation provides more freedom in guilloché mark design to satisfy various aesthetic needs. This is particularly advantageous for simple patterns, which often look boring and lacking variation.

The modulation enhances security in two aspects: first, demodulation will be necessary before the modulated pattern can be decoded. As demodulation requires knowledge of the transform function F(x, y), it imposes additional hindrances for unauthorized parties, as extra efforts are needed to identify the transform function. Merely encoding with the same geometric variations corresponding to a particular font symbol results in periodic line patterns for the same symbol that are identical (unless additional encryption is applied). The modulation makes the geometric variation template symbols different and more secure.

As the modulation is independent of any particular periodic line pattern, the modulation function may also be used to serve as a separate information conveying channel. For example, sinusoids of different frequencies can be used to modulate FIG. 1A into FIG. 1B, each sinusoid representing a different error correction coding parameter set. At the detection side, the frequency of the sinusoid is first estimated. Such an estimate can be easily achieved by hypothesis testing. The detected frequency is then used to determining the parameters used in error correction decoding.

Figure 1B:
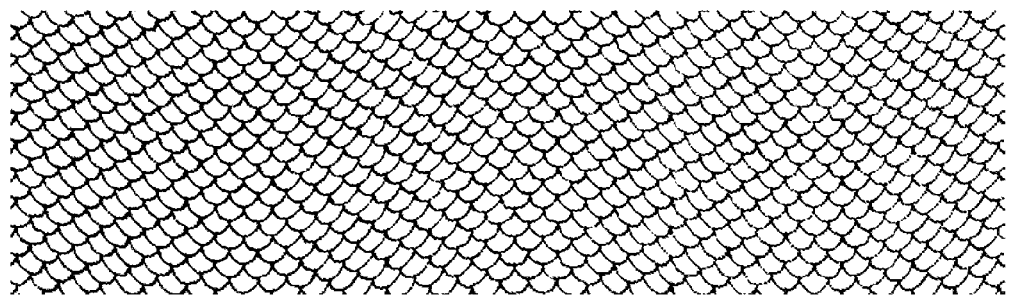
FIG. 1B is the pattern of FIG. 1A modulated by a transform function of periodicities in periodic line pattern.

FIG. 1A shows an un-modulated periodic line pattern 10. In FIG. 1B, the image of FIG. 1A is modulated by the transform function F(x, y)=[x, y+A sin(w x)], where A and w are constants.

Figure 2A:
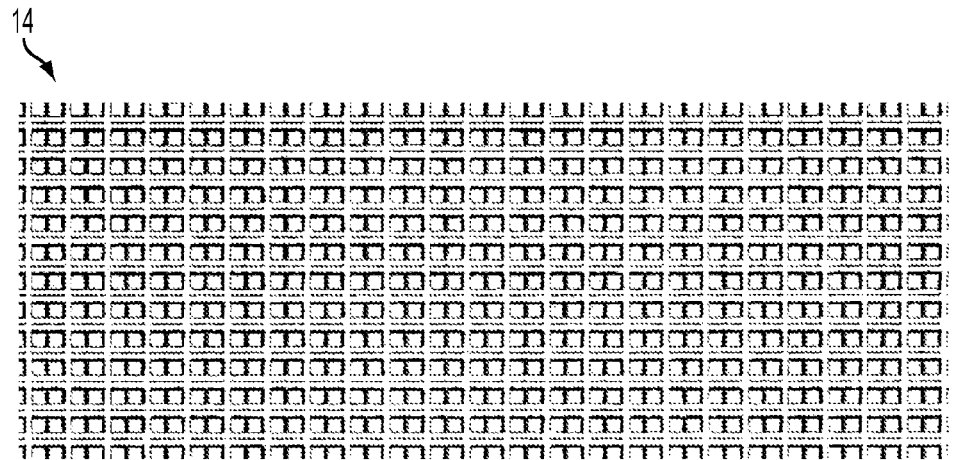
FIG. 2A is another periodic line pattern.
Figure 2B:
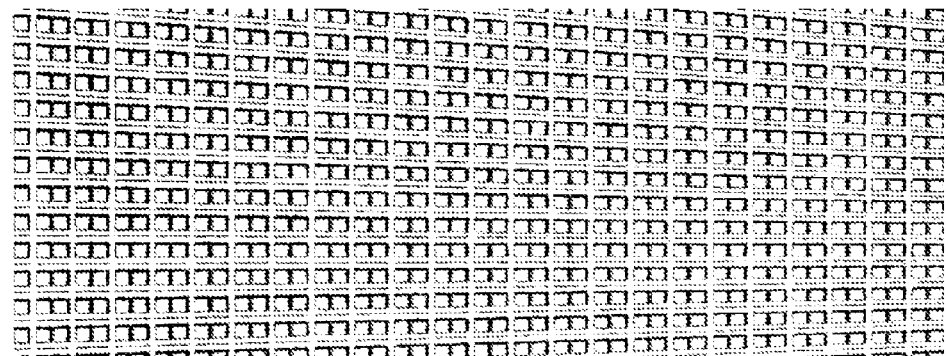
FIG. 2B is a modulated form of FIG. 2A.

FIG. 2A is another periodic line pattern 14 which is modulated in FIG. 2B by a transform function F(x, y)=[x, y+(1−x/w)], where w is a constant.

Figure 3A:
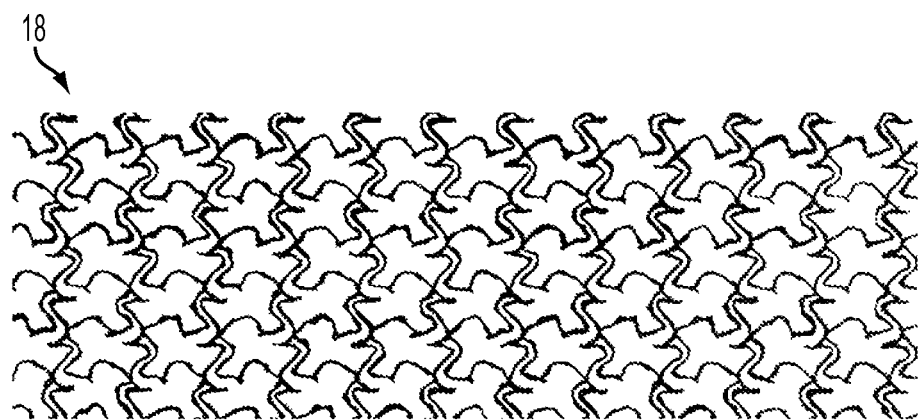
FIG. 3A is another periodic line pattern.
Figure 3B:
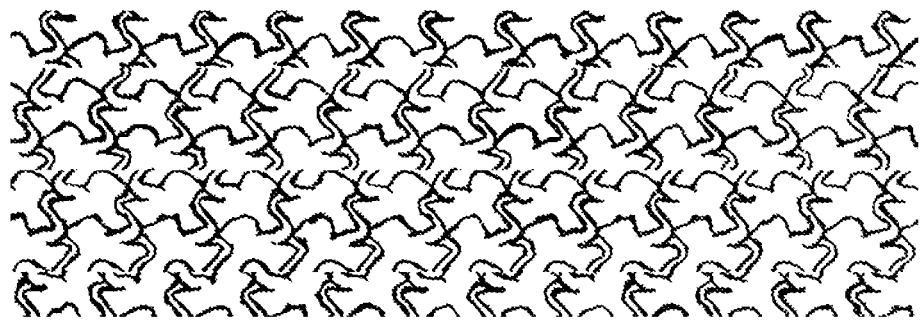
FIG. 3B is a modulated form of FIG. 3A.

FIG. 3A is yet another un-modulated periodic line pattern 18 which is modulated in FIG. 3B with the transform function F(x, y)=[x+A[round (y/w) % 2], y}, where A and w are constants.

The subject method and system comprises an embedding procedure conceptually containing three steps: first, cell classification, which classifies pattern cells as data or skipped; second, information embedding, which embeds information into data cells; and, third, data pattern modulation, which modulates the patterns with additional embedded data.

Figure 4A:
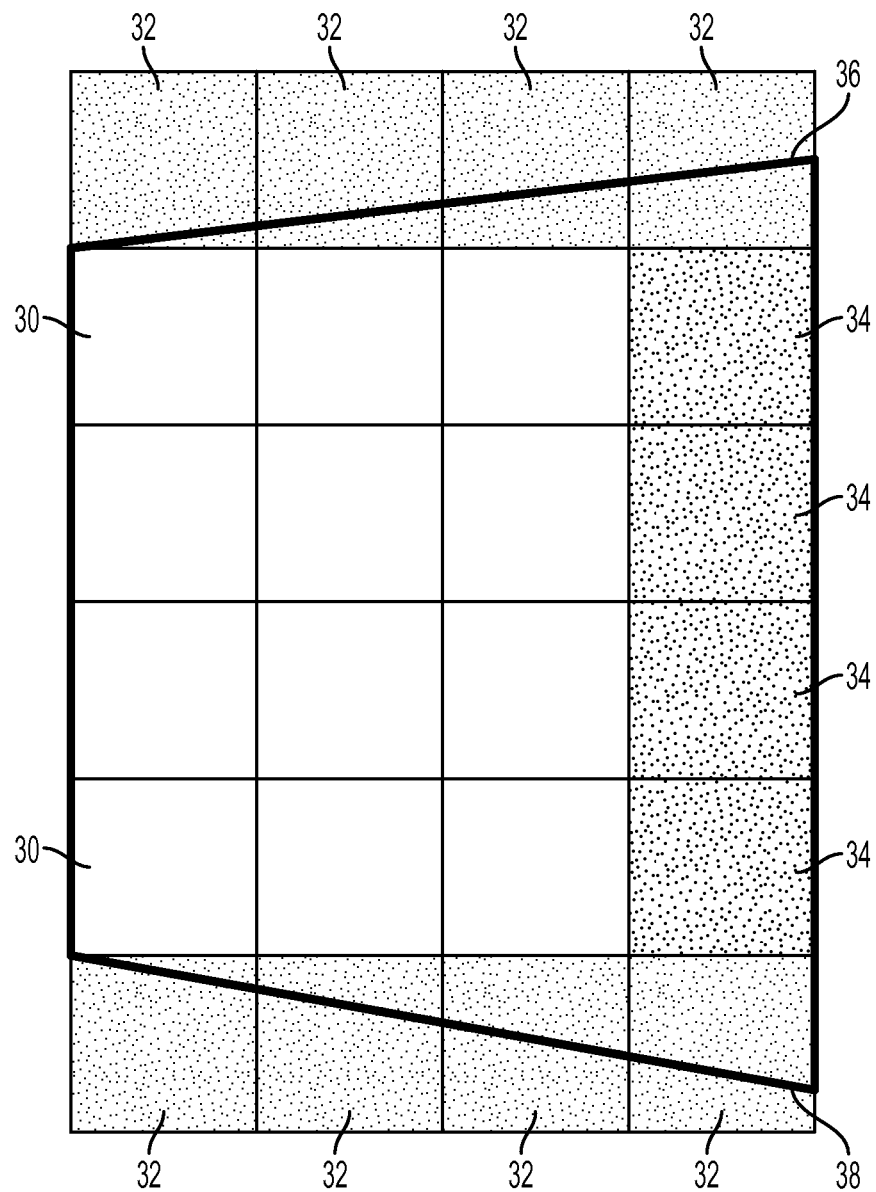
FIG. 4A is a cell structure of an un-modulated image.
Figure 4B:
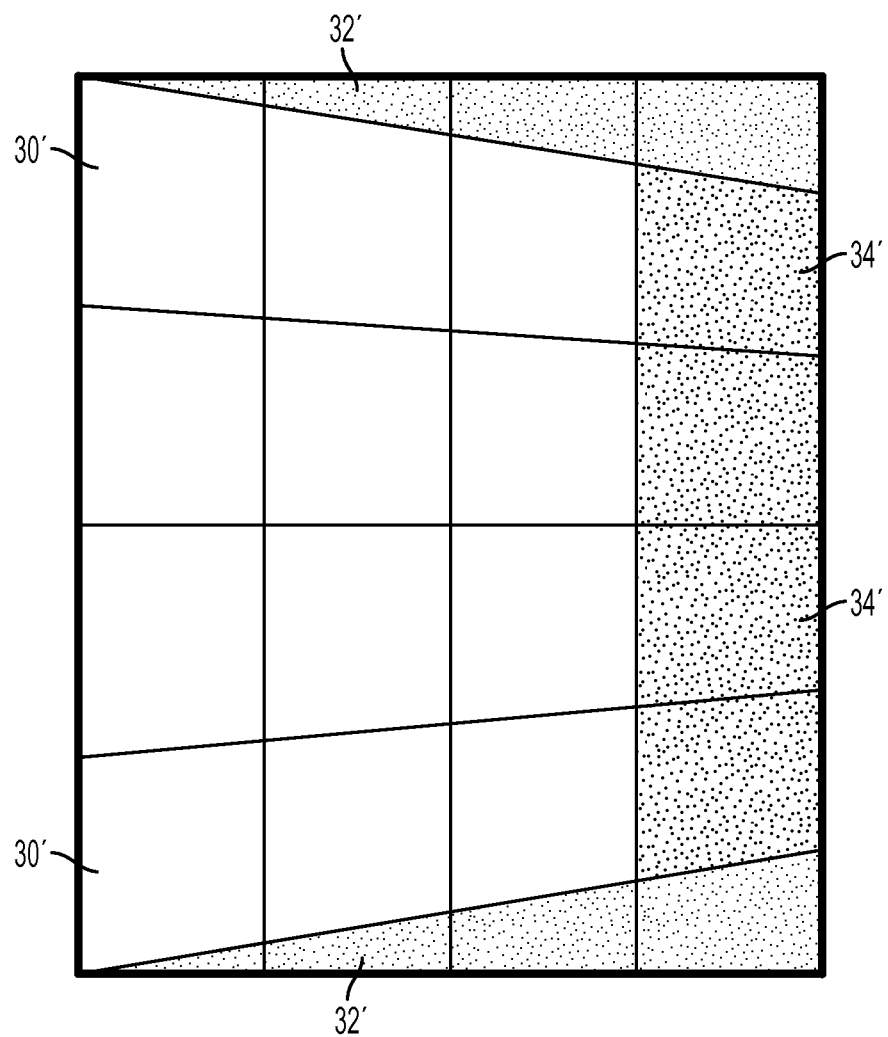
FIG. 4B is a corresponding cell structure of the modulated image of 4A.

With particular reference to FIGS. 4A and 4B, cell classification is necessary for two reasons. First, modulation changes the boundary of the periodic line pattern marking area. Some cells in the original image could be moved, fully or partially, out of the pattern marking area in the modulated image. Second, modulation could be information-losing if it shrinks a cell. The effect of modulation may not be fully recoverable by demodulation. Both cases are illustrated in FIG. 4A and FIG. 4B. In FIG. 4A, an un-modulated periodic line pattern is segregated into a plurality of cells 30, 32, 34. Merely for purposes of example, and without limitation, FIG. 4A illustrates the cells as rectangular. Lines 36 and 38 illustrate the boundary of the pattern of FIG. 4A when it is modulated into the image of FIG. 4B. It can be seen that the portions of cells 32' above line 36 and below line 38 will be outmoving cells in the modulated image and cells 34' are squeezed in a horizontal direction due to the modulation. Cells 34' become too small and the information they carry may not be reliably retrieved during decoding.

The cells in FIG. 4A are classified as follows. The periodic line pattern area boundary in the modulated image is first mapped with $F^{-1}(x, y)$ to the original image (e.g. lines 36, 38). The cells that are out of the boundary (entirely or partially) are identified as skipped cells. The interior skipped cells 34' can be determined by one of the following two methods. If the cell becomes too small after modulation, e.g. if the distance between any two of its corners is smaller than a predetermined threshold, then that cell is identified as a skipped cell. A second method of identification of a skipped cell tests is if the modulation/demodulation process significantly reduces the information carrying capability of a cell. Specifically, the cell is first coded with different symbols, modulated, and then demodulated. The cell is then matched to the templates of all symbols to determine the probability of a decoding error. The cell is identified as skipped if the error metric exceeds a predetermined threshold.

Any so identified skipped cells are not modified with any geometric variations corresponding to predetermined data or font symbols.

Non-skipped data cells are modulated as follows. The periodic pattern is periodic in two dimensional and has the property of:

$$C(x,y)=C(x+kP_x, y+rP_y) \text{ for any integers } k \text{ and } r \qquad (1)$$

where C(x, y) is the gray level (or color) for pixel (x, y), and $P_x$ and $P_y$ are the periodicities in x and y directions, respectively.

The proposed method modulates the periodic pattern. Specifically, $$D(x,y)=C[F(x,y)] \qquad (2)$$

where two dimensional nonlinear function F(x, y) maps pixel location (x, y) to a new location F(x, y), and D(x, y) specifies the gray level (or color) of the modulated image.

D(x, y) is typically non-periodic in the original Cartesian coordinate, but periodic in a transformed coordinate system. Specifically, $$D[F^{-1}(x,y)] = D[F^{-1}(x+kP_x, y=rP_y)] \text{ for any integers } k \text{ and } r \quad (3)$$

where $F^{-1}(x, y)$ is the inverse transform of F(x, y).

For information retrieval, the image is first demodulated using $$C(x,y) = D[F^{-1}(x,y)] \quad (4)$$

The embedded information is then decoded by template correlation. The decoding process is similar to U.S. Patent Publication No. 2008-0297852-A1 and U.S. Patent Publication No. 2008-0296885-A1, referenced above. But again, the skipped cells are skipped.

The modulation function F(x, y) (or its inverse) is either known to the decoder, or communicated to the decoding side. This can be part of the side information transmitted together with font specification. The function can be fully specified, or partially described. For example, it is known to the decoder the modulation function is a sinusoid with a certain amplitude, but the decoder needs to estimate its period and phase.

Cell classification information may also need to be transmitted as a part of the side information. However, if the cell classification is based on cell dimension, this might not be necessary, as the same classification may also be generated from the decoding side (with caution for possible classification error).

Figure 5:
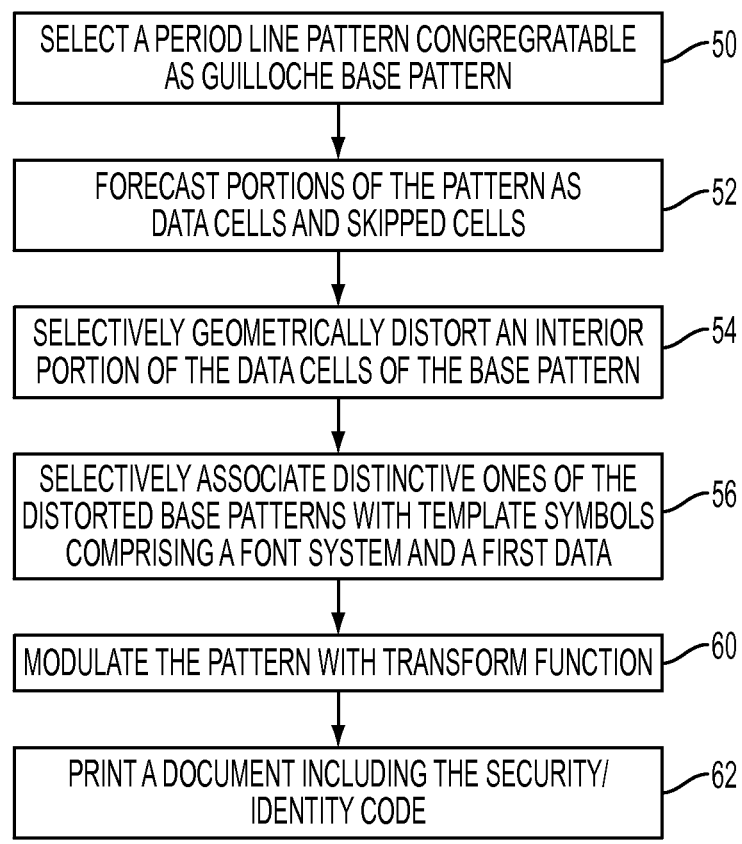
FIG. 5 is a flowchart illustrating a method for using the subject system for encoding information using modulated periodic line patterns; and, FIG. 6 is a flowchart illustrating decoding of the modulated pattern.
Figure 6:
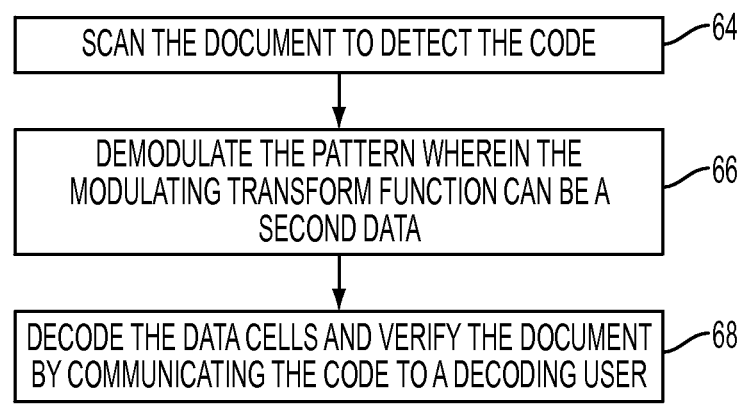

FIGS. 5 and 6 are flowcharts illustrating encoding (blocks 52-62) and decoding (blocks 64-68). With reference to FIG. 5, a flowchart particularly identifies a method for practicing the subject embodiments for encoding. A periodic line pattern is selected 50 as congregratable as a guilloché periodic pattern. Portions of the pattern are classified 52 as either data or skipped cells. The data cells are selectively geometrically distorted 54 so that they can be associated 56 with template symbols comprising a font system functioning as a first type of embedded data The periodic line pattern is then modulated with a predetermined transform function and the document is printed 62 including the security/identity code. With reference to FIG. 6, a flowchart identifies a method for practicing the subject embodiments for decoding. The document containing the encoded information is scanned 64 to detect the code and the pattern is demodulated 66. Lastly, the data cells and document are decoded 68 and communicated to a decoding user.

The claims can encompass embodiments in hardware, software, or a combination thereof.

The word "printer" as used herein encompasses any apparatus, such as a digital copier, bookmaking machine, facsimile machine, multi-function machine, etc. which performs a print outputting function for any purpose.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of encoding a periodic line pattern comprising:

providing a periodic line base pattern;
segregating the base pattern into a plurality of cells;
modulating selected ones of the plurality of cells wherein the modulating is a geometrical modulation representative of predetermined information; and
embedding encoded data within the selected ones prior to the modulating.

2. The method of claim 1 further including retrieving the predetermined information for verifying a document including the periodic pattern.

3. The method of claim 1 wherein the embedding comprises geometrically varying the periodic line base pattern.

4. The method of claim 1 further including demodulating the selected cells and determining if the predetermined information authenticates a printed document with the predetermined information.

5. The method of claim 1 wherein the providing the periodic line pattern includes creating a guilloché pattern.

6. The method of claim 1 wherein the modulating comprises imposing a transform function of periodicities in the periodic line pattern.

7. A method of encoding a periodic line pattern comprising:

providing a periodic line base pattern;
segregating the base pattern into a plurality of cells;
modulating selected ones of the plurality of cells wherein the modulating is a geometrical modulation representative of predetermined information; wherein the modulating comprises spatially modulating the base pattern of the selected ones, the segregating includes classifying selected portions of the periodic line base pattern as data cells and skipped cells and wherein the skipped cells are determined by a preselected threshold of size dimension after modulation.

8. The method of claim 7 further including embedding the encoded data in the data cells.

9. The method of claim 4 further including decoding the embedded data after the demodulating.

10. A printing system including an electronically stored periodic line pattern residing in a memory for use in securing or identifying a document printed by the printing system comprising:

a base periodic line pattern capable of encoding with first data by selected geometric variation;
a first set of distinguishable variations of the base pattern, each variation corresponding to an encodable symbol comprising the first data and wherein the variation is disposed in a portion of the base periodic line pattern comprising a data cell; and,
a second set of distinguishable variations of the pattern comprising a spatial modulation of the data cell according to a transform function wherein the spatial modulation comprises second data, whereby the first and second data are useful for identifying or authenticating the printed document and wherein the second data comprises additional information or a control/registration signal.

11. The system of claim 10 further including skipped cells comprising other portions of the base periodic line pattern that are predetermined to lack a capability of functioning as the first data after the spatial modulation.

12. The system of claim 10 wherein the transform function comprises periodicities in the periodic line pattern.

13. The system of claim 11 wherein the skipped cells are predetermined based on size after modulation.

* * * * *